US012646635B2

(12) United States Patent
Fujii

(10) Patent No.: US 12,646,635 B2
(45) Date of Patent: Jun. 2, 2026

(54) SILVER POWDER AND METHOD FOR PRODUCING SAME

(71) Applicant: DOWA ELECTRONICS MATERIALS CO., LTD., Tokyo (JP)

(72) Inventor: Masanori Fujii, Tokyo (JP)

(73) Assignee: DOWA ELECTRONICS MATERIALS CO., LTD., Tokyo (JP)

( * ) Notice: Subject to any disclaimer, the term of this patent is extended or adjusted under 35 U.S.C. 154(b) by 753 days.

(21) Appl. No.: 17/621,896

(22) PCT Filed: Jun. 16, 2020

(86) PCT No.: PCT/JP2020/023604
§ 371 (c)(1),
(2) Date: Dec. 22, 2021

(87) PCT Pub. No.: WO2020/262115
PCT Pub. Date: Dec. 30, 2020

(65) Prior Publication Data
US 2022/0243086 A1 Aug. 4, 2022

(30) Foreign Application Priority Data

Jun. 27, 2019 (JP) ................................. 2019-119911
Jun. 15, 2020 (JP) ................................. 2020-102842

(51) Int. Cl.
*H01B 1/22* (2006.01)
*B22F 1/00* (2022.01)
(Continued)

(52) U.S. Cl.
CPC ................. *H01B 1/22* (2013.01); *B22F 1/00* (2013.01); *B22F 1/052* (2022.01); *B22F 1/107* (2022.01);
(Continued)

(58) Field of Classification Search
None
See application file for complete search history.

(56) References Cited

U.S. PATENT DOCUMENTS

2007/0164260 A1* 7/2007 Kuwajima ............. H05K 1/095
252/512
2018/0102341 A1* 4/2018 Konno ............... B23K 35/3006

FOREIGN PATENT DOCUMENTS

JP 0195170 A 4/1989
JP 06123936 A 5/1994
(Continued)

OTHER PUBLICATIONS

English text machine translation of Okada et al. (WO 2012/176831 A1) accessed online from Espacenet; PDF pp. 1-35. (Year: 2012).*
(Continued)

*Primary Examiner* — Katie L. Hammer
(74) *Attorney, Agent, or Firm* — Bachman & LaPointe, P.C.

(57) ABSTRACT

There are provided a silver powder, which is able to form an electrically conductive film having a lower resistance value than that of conventional electrically conductive films when the silver powder is used as the material of an electrically conductive paste which is fired to form the electrically conductive film, and a method for producing the same. A first silver powder having one peak or more, at each of which a frequency is a local maximum value in a volume-based particle size distribution obtained by measuring the first silver powder in a dry process by means of a laser diffraction particle size analyzer, is mixed with a second silver powder having two peaks or more, at each of which a frequency is a local maximum value in a volume-based particle size distribution obtained by measuring the second silver powder in a dry process by means of a laser diffraction particle size analyzer, to produce a silver powder having three peaks or
(Continued)

more, at each of which a frequency is a local maximum value in a volume-based particle size distribution obtained by measuring the silver powder in a dry process by means of a laser diffraction particle size analyzer, the silver powder having one peak, at which a frequency is a local maximum value in a volume-based particle size distribution obtained by measuring the silver powder in a wet process by means of a laser diffraction scattering particle size analyzer.

9 Claims, 14 Drawing Sheets

(51) Int. Cl.

| | |
|---|---|
| *B22F 1/052* | (2022.01) |
| *B22F 1/107* | (2022.01) |
| *B22F 9/04* | (2006.01) |
| *C09D 11/033* | (2014.01) |
| *C09D 11/037* | (2014.01) |
| *C09D 11/14* | (2006.01) |
| *C09D 11/52* | (2014.01) |
| *H01B 13/00* | (2006.01) |

(52) U.S. Cl.
CPC .............. *B22F 9/04* (2013.01); *C09D 11/033* (2013.01); *C09D 11/037* (2013.01); *C09D 11/14* (2013.01); *C09D 11/52* (2013.01); *H01B 13/00* (2013.01); *B22F 2301/255* (2013.01); *B22F 2304/10* (2013.01)

(56) References Cited

FOREIGN PATENT DOCUMENTS

| | | |
|---|---|---|
| JP | 2001204688 A | 7/2001 |
| WO | 2012176831 A1 | 12/2012 |
| WO | 2016136950 A1 | 9/2016 |

OTHER PUBLICATIONS

International search report for patent application No. PCT/JP2020/023604 dated Sep. 1, 2020.

* cited by examiner

SEM

SILVER POWDER AND METHOD FOR PRODUCING SAME

BACKGROUND OF THE INVENTION

The present invention relates generally to a silver powder and a method for producing the same. More specifically, the invention relates to a silver powder which can be suitably used as the material of an electrically conductive paste, and a method for producing the same.

Conventionally, metal powders, such as silver powders, are used as the material of an electrically conductive paste for forming electrodes of solar cells, internal electrodes of multilayer ceramic electronic parts, such as electronic parts using low-temperature co-fired ceramics (LTCC) and multilayer ceramic inductors (MLCI), external electrodes of multilayer ceramic capacitors and/or multilayer ceramic inductors, and so forth.

As the material of such an electrically conductive paste, there is proposed an electrically conductive mixed powder which contains substantially spherical particles of two kinds of silver, palladium and alloys thereof having substantially monodispersed particle diameters and which has a relative packing density of 68 to 80%, the average particle diameter of one of the two kinds of silver, palladium and alloys thereof being 5 to times as large as the average particle diameter of the other of the two kinds of silver, palladium and alloys thereof (see, e.g., Patent Document 1).

As the use of mixed metal particles obtained by mixing two kinds of metal particles, there is proposed an electrically conductive coating material wherein mixed metal particles (having two peaks or more in the particle size distribution thereof) are dispersed, the mixed metal particles being obtained by mixing large-diameter metal particles having an average particle diameter of 2 to 20 μm with small-diameter metal particles having an average particle diameter of 0.1 to 1 μm (see, e.g., Patent Document 2).

PRIOR ART DOCUMENT(S)

Patent Document(s)

Patent Document 1: JP 2001-204688 (Paragraph Number 0012)
Patent Document 2: JP H01-095170 (Page 2)

SUMMARY OF THE INVENTION

However, if the electrically conductive mixed powder of Patent Document 1 or the mixed metal particles of Patent Document 2 is used as the material of an electrically conductive paste which is fired to form an electrode of a solar cell, there is some possibility that the resistance value of the electrode may be relatively high, so that it is desired to decrease the resistance value of the electrode in order to improve the conversion efficiently of the solar cell.

It is therefore an object of the present invention to eliminate the aforementioned conventional problems and to provide a silver powder which is able to form an electrically conductive film having a lower resistance value than that of conventional electrically conductive films when the silver powder is used as the material of an electrically conductive paste which is fired to form the electrically conductive film, and a method for producing the same.

In order to accomplish the aforementioned object, the inventors have diligently studied and found that it is possible to produce a silver powder which is able to form an electrically conductive film having a lower resistance value than that of conventional electrically conductive films when the silver powder is used as the material of an electrically conductive paste which is fired to form the electrically conductive film, if a first silver powder having one peak or more, at each of which a frequency is a local maximum value in a volume-based particle size distribution obtained by measuring the first silver powder in a dry process by means of a laser diffraction particle size distribution analyzer, is mixed with a second silver powder having two peaks or more, at each of which a frequency is a local maximum value in a volume-based particle size distribution obtained by measuring the second silver powder in a dry process by means of the laser diffraction particle size distribution analyzer, to produce a silver powder having three peaks or more, at each of which a frequency is a local maximum value in a volume-based particle size distribution obtained by measuring the silver powder in a dry process by means of the laser diffraction particle size distribution analyzer, the silver powder having one peak, at which a frequency is a local maximum value in a volume-based particle size distribution obtained by measuring the silver powder in a wet process by means of a laser diffraction scattering particle size distribution analyzer. Thus, the inventors have made the present invention.

According to the present invention, there is provided a method for producing a silver powder, the method comprising the steps of: preparing a first silver powder having one peak or more, at each of which a frequency is a local maximum value in a volume-based particle size distribution obtained by measuring the first silver powder in a dry process by means of a laser diffraction particle size distribution analyzer; preparing a second silver powder having two peaks or more, at each of which a frequency is a local maximum value in a volume-based particle size distribution obtained by measuring the second silver powder in a dry process by means of the laser diffraction particle size distribution analyzer; and mixing the first silver powder with the second silver powder to produce a silver powder having three peaks or more, at each of which a frequency is a local maximum value in a volume-based particle size distribution obtained by measuring the silver powder in a dry process by means of the laser diffraction particle size distribution analyzer, the silver powder having one peak, at which a frequency is a local maximum value in a volume-based particle size distribution obtained by measuring the silver powder in a wet process by means of a laser diffraction scattering particle size distribution analyzer.

In this method for producing a silver powder, a particle diameter ($D_{50}$) corresponding to 50% of accumulation in a volume-based particle size distribution obtained by measuring the first silver powder in the wet process is preferably larger than a particle diameter ($D_{50}$) corresponding to 50% of accumulation in a volume-based particle size distribution obtained by measuring the second silver powder in the wet process. The particle diameter ($D_{50}$) corresponding to 50% of accumulation in a volume-based particle size distribution obtained by measuring the second silver powder in the wet process is preferably in the range of from 0.3 μm to 1 μm. The particle diameter ($D_{50}$) corresponding to 50% of accumulation in a volume-based particle size distribution obtained by measuring the first silver powder in the wet process is preferably in the range of from 1 μm to 4 μm and not greater than 4 times as large as the particle diameter ($D_{50}$) corresponding to 50% of accumulation in a volume-based particle size distribution obtained by measuring the second silver powder in the wet process. The measurement in the wet process by means of the laser diffraction scattering particle size distribution analyzer is preferably carried out in a state that the silver powder is dispersed in isopropyl alcohol.

According to the present invention, there is provided a silver powder having three peaks or more, at each of which a frequency is a local maximum value in a volume-based particle size distribution obtained by measuring the silver powder in a dry process by means of a laser diffraction particle size distribution analyzer, the silver powder having one peak, at which a frequency is a local maximum value in a volume-based particle size distribution obtained by measuring the silver powder in a wet process by means of a laser diffraction scattering particle size distribution analyzer.

In this silver powder, a particle diameter ($D_{50}$) corresponding to 50% of accumulation in a volume-based particle size distribution obtained by measuring the silver powder in the wet process is preferably in the range of from 1.2 μm to 3.0 μm. The ratio of a particle diameter ($D_{90}$), which corresponds to 90% of accumulation in the volume-based particle size distribution, to a particle diameter ($D_{10}$), which corresponds to 10% of accumulation in the volume-based particle size distribution, is preferably in the range of from 2.0 to 8.0. The measurement in the wet process by means of the laser diffraction scattering particle size distribution analyzer is preferably carried out in a state that the silver powder is dispersed in isopropyl alcohol.

According to the present invention, there is provided an electrically conductive paste wherein the above-described silver powder is dispersed in an organic component.

Throughout the specification, the expression "peaks, at each of which a frequency is a local maximum value in a volume-based particle size distribution" means measured points, each of which denotes a local maximum value in a histogram denoting a frequency distribution obtained by such measurement that the ratio of a particle diameter at a measured point to that at an adjacent measured point thereto is 1.2 in a dry process (1.09 in a wet process), when a volume-based particle size distribution denoted by a particle size (μm) as a horizontal axis and by a frequency (%) as a vertical axis is denoted as a frequency distribution. Furthermore, when the number of the peaks is plural, if a peak having the maximum frequency is a main peak and if the other peak is a sub-peak, the "peaks, at each of which a frequency is a local maximum value in a volume-based particle size distribution" do not include a sub-peak having a very small frequency which is not able to be distinguished from a background (a sub-peak having a frequency of 15% or less with respect to the frequency of the main peak), and a sub-peak having a very small difference between the particle diameter at the main peak and the particle diameter at the sub-peak (a sub-peak having a difference between the particle diameter at the main peak and the particle diameter at the sub-peak, the difference being less than 30% with respect to the particle diameter at the main peak). Also in the relationship between sub-peaks, the "peaks, at each of which a frequency is a local maximum value in a volume-based particle size distribution" do not include a sub-peak having a very small frequency, and a sub-peak having a very small difference from the particle diameter at the other sub-peak.

According to the present invention, it is possible to produce a silver powder which is able to form an electrically conductive film having a lower resistance value than that of conventional electrically conductive films when the silver powder is used as the material of an electrically conductive paste which is fired to form the electrically conductive film.

Figure 1A:
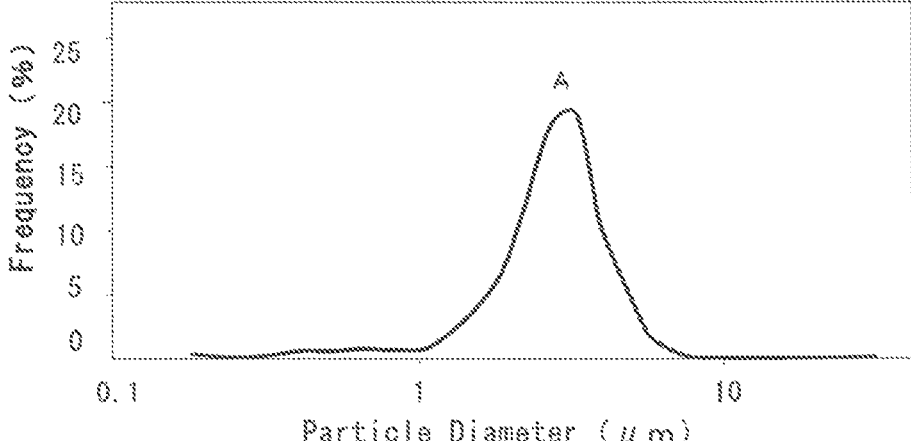
FIG. 1A is a graph showing a volume-based particle size distribution obtained by measuring a silver powder 1, which is used in examples, in a dry process by means of a laser diffraction particle size analyzer.

In the preferred embodiment of a method for producing a silver powder according to the present invention, a first silver powder having one peak or more, at each of which a frequency is a local maximum value in a volume-based particle size distribution obtained by measuring the first silver powder in a dry process by means of a laser diffraction particle size distribution analyzer, is mixed with a second silver powder having two peaks or more, at each of which a frequency is a local maximum value in a volume-based particle size distribution obtained by measuring the second silver powder in a dry process by means of the laser diffraction particle size distribution analyzer, to produce a silver powder having three peaks or more, at each of which a frequency is a local maximum value in a volume-based particle size distribution obtained by measuring the silver powder in a dry process by means of the laser diffraction particle size distribution analyzer, the silver powder having one peak, at which a frequency is a local maximum value in a volume-based particle size distribution obtained by measuring the silver powder in a wet process by means of a laser diffraction scattering particle size distribution analyzer.

With respect to the first and second silver powders used in the preferred embodiment of a method for producing a silver powder, the agglomerating property of the first silver powder is different from that of the second silver powder. In such a silver powder obtained by mixing the silver powders having different agglomerating properties from each other, the agglomeration of the silver powder gets loose to cause the number of peaks, at each of which a frequency is a local maximum value in a volume-based particle size distribution, to be one in a condition that dispersion force works (in such a state that the silver powder is dissolved in a solvent), and the agglomerating force of the silver powder causes the number of peaks, at which a frequency is a local maximum value in a volume-based particle size distribution, to be three or more to enhance the repletion of the silver powder in a condition (such as a dry state) that dispersion force does not work. If such a silver powder is used as the material of an electrically conductive paste which is applied to be dried, it is possible to form a uniform high-filling film having few cracks and scratches. If such a high-filling film is fired, it is possible to form an electrically conductive film having a low resistance value. If the cross-section of the electrically conductive film thus formed is observed, the percentage of an area, which is occupied by cavities (formed when silver particles agglomerate by firing), and the size of the cavities are smaller than those on the cross-section of an electrically conductive film which is formed by using a conventional silver powder as the material of an electrically conductive paste. It is considered that the resistance value of the electrically conductive film is lowered if the area, which is occupied by the cavities, and the size of the cavities are thus decreased.

In this method for producing a silver powder, a particle diameter ($D_{50}$) corresponding to 50% of accumulation in a volume-based particle size distribution obtained by measuring the first silver powder in the wet process is preferably larger than a particle diameter ($D_{50}$) corresponding to 50% of accumulation in a volume-based particle size distribution obtained by measuring the second silver powder in the wet process. The particle diameter ($D_{50}$) corresponding to 50% of accumulation in the volume-based particle size distribution obtained by measuring the second silver powder in the wet process is preferably in the range of from 0.3 μm to 1 μm and more preferably in the range of from 0.5 μm to 0.9 μm. The particle diameter ($D_{50}$) corresponding to 50% of accumulation in the volume-based particle size distribution obtained by measuring the first silver powder in the wet process is preferably in the range of from 1 μm to 4 μm and more preferably in the range of from 1.5 μm to 3.3 μm. The particle diameter ($D_{50}$) corresponding to 50% of accumulation in the volume-based particle size distribution obtained by measuring the first silver powder in the wet process is preferably not greater than 5 times (more preferably not greater than 4 times) as large as the particle diameter ($D_{50}$) corresponding to 50% of accumulation in the volume-based particle size distribution obtained by measuring the second silver powder in the wet process. Furthermore, the weight ratio (first silver powder second silver powder) of the first silver powder to the second silver powder in the silver powder (mixed silver powder) is preferably 95:5 to 50:50 and more preferably 90:10 to 65:35. The measurement in the wet process by means of the laser diffraction scattering particle size distribution analyzer is preferably carried out in a state that the silver powder is dispersed in isopropyl alcohol.

The preferred embodiment of a silver powder according to the present invention has three peaks or more, at each of which a frequency is a local maximum value in a volume-based particle size distribution obtained by measuring the silver powder in a dry process by means of a laser diffraction particle size distribution analyzer, the silver powder having one peak, at which a frequency is a local maximum value in a volume-based particle size distribution obtained by measuring the silver powder in a wet process by means of a laser diffraction scattering particle size distribution analyzer.

In this silver powder, a particle diameter ($D_{50}$) corresponding to 50% of accumulation in a volume-based particle size distribution obtained by measuring the silver powder in the wet process is preferably in the range of from 1.2 μm to 3.0 μm and more preferably in the range of from 1.5 μm to 2.8 μm. The ratio of a particle diameter ($D_{90}$), which corresponds to 90% of accumulation in the volume-based particle size distribution, to a particle diameter ($D_{10}$), which corresponds to 10% of accumulation in the volume-based particle size distribution, is preferably in the range of from 2.0 to 8.0 and more preferably in the range of from 2.5 to 7.0. The measurement in the wet process by means of the laser diffraction scattering particle size distribution analyzer is preferably carried out in a state that the silver powder is dispersed in isopropyl alcohol.

Furthermore, the shape of each of the above-described first and second silver powders may be any one of various granular shapes, such as spherical shapes or flake shapes, and indefinite shapes which are irregular shapes.

When the preferred embodiment of a silver powder according to the present invention is used as the material of an electrically conductive paste (such as a baked type electrically conductive paste), the electrically conductive paste contains the silver powder, and an organic solvent (such as saturated aliphatic hydrocarbons, unsaturated aliphatic hydrocarbons, ketones, aromatic hydrocarbons, glycol ethers, esters or alcohols), as components thereof. If necessary, the electrically conductive paste may contain a vehicle, which contains a binder resin (such as ethyl cellulose or acrylic resin) dissolved in an organic solvent, glass frits, inorganic oxides, dispersing agents, and so forth, as components thereof.

The content of the silver powder in the electrically conductive paste is preferably to 98% by weight and more preferably 70 to 95% by weight, from the points of view of the conductivity and producing costs of the electrically conductive paste. The content of the binder resin in the electrically conductive paste is preferably 0.1 to 10% by weight and more preferably 0.1 to 6% by weight, from the points of view of the dispersibility of the silver powder in the electrically conductive paste and of the conductivity of the electrically conductive paste. Two kinds or more of the vehicles, each of which contains the binder resin dissolved in the organic solvent, may be mixed to be used. The content of the glass frits in the electrically conductive paste is preferably 0.1 to 20% by weight and more preferably 0.1 to 10% by weight, from the points of view of the procurance of the conduction between an electrode and a substrate due to fire through and of the conductivity of the electrode after the electrically conductive paste is sintered when the electrically conductive paste is applied on the substrate to form the electrode. Two kinds or more of the glass frits may be mixed to be used. The content of the organic solvent in the electrically conductive paste (the total content of the organic solvents containing the organic solvent of the vehicle when the electrical conductive paste contains the vehicle) is preferably in the range of from 0.8% by weight to 20% by weight and more preferably in the range of from 0.8% by weight to 15% by weight, from the points of view of the dispersibility of the silver powder in the electrically conductive paste and of the appropriate viscosity of the electrically conductive paste. Two kinds or more of the organic solvents may be mixed to be used.

For example, such an electrically conductive paste can be prepared by putting components, the weights of which are measured, in a predetermined vessel to preliminarily knead the components by means of a Raikai mixer (grinder), an all-purpose mixer, a kneader or the like, and thereafter, kneading them by means of a three-roll mill. Thereafter, an organic solvent may be added thereto to adjust the viscosity thereof, if necessary. The silver powder may be finally added to be kneaded after only the glass frits, the inorganic oxide and the vehicle are kneaded to decrease the particle size thereof.

EXAMPLES

Examples of a silver powder and a method for producing the same according to the present invention will be described below in detail.

Example 1

As the silver powder 1, a commercially available silver powder (AG-5-54F produced by DOWA Hightech Co., Ltd.) was prepared. The volume-based particle size distribution of the silver powder 1 (based on a dry laser diffraction particl3e size distribution measurement) was measured by using a measuring lens R1 at a focal length of 20 mm, at a dispersing pressure of 2.0 bar and at a suction pressure of 100 mbar by means of a dry laser diffraction particle size distribution analyzer (SYMPATEC particle size distribution analyzer (HELOS & RODOS) produced by Japan Laser Co., Ltd.). As a result, the particle diameter ($D_{10}$) corresponding to 10% of accumulation was 1.4 µm, the particle diameter ($D_{50}$) corresponding to 50% of accumulation was 2.8 µm, and the particle diameter ($D_{90}$) corresponding to 90% of accumulation was 4.2 µm. This particle size distribution had one peak, at which a frequency was a local maximum value. Assuming that the particle diameter having the maximum frequency was a peak particle diameter A, it was 3.6 µm at a frequency of 19.6%. The measured results are shown in FIG. 1A.

Figure 1B:
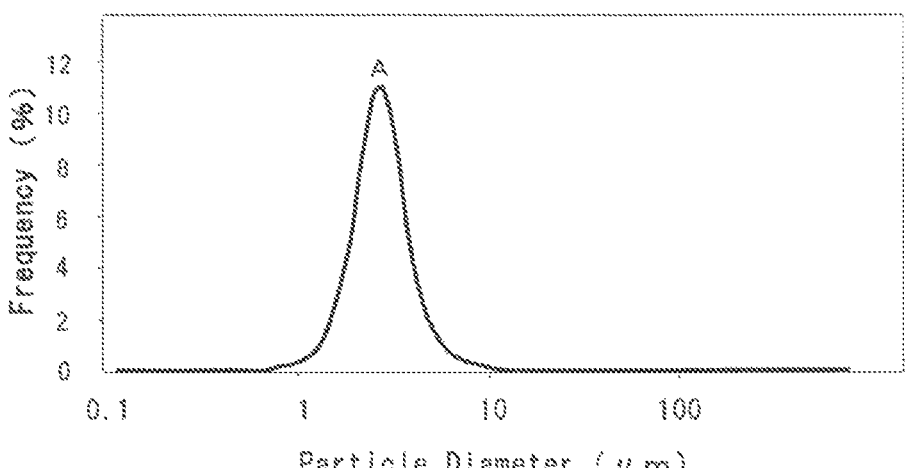
FIG. 1B is a graph showing a volume-based particle size distribution obtained by measuring the silver powder 1, which is used in examples, in a wet process by means of a laser diffraction scattering particle size analyzer.
Figure 1C:
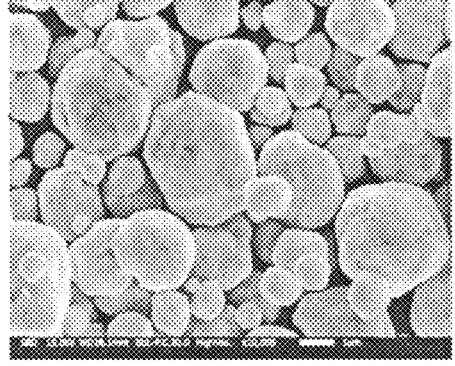
FIG. 1C is a scanning electron micrograph (SEM image) of the silver powder 1 which is used in examples and which is observed at a magnification of 10,000.

Then, 0.1 g of the above-described silver powder (silver powder 1) was added to 40 mL of isopropyl alcohol (IPA) to be dispersed for 2 minutes by means of an ultrasonic homogenizer (US-150T produced by NISSEI Corporation, 19.5 kHz) having a chip distal end diameter of 18 mm to obtain a sample. With respect to this sample, the volume-based particle size distribution of the silver powder (based on a wet laser diffraction scattering particle size distribution measurement) was obtained in a total reflection mode by means of a laser diffraction scattering particle size distribution analyzer (MICROTRAC MT3300 EXII produced by Microtrac BEL Corporation). As a result, the particle diameter ($D_{10}$) corresponding to 10% of accumulation was 1.7 µm, the particle diameter ($D_{50}$) corresponding to 50% of accumulation was 2.5 µm, and the particle diameter ($D_{90}$) corresponding to 90% of accumulation was 3.9 µm. This particle size distribution had one peak, at which a frequency was a local maximum value. Assuming that the particle diameter having the maximum frequency was a peak particle diameter A, it was 2.8 µm at a frequency of 11.2%. The measured results are shown in FIG. 1B. The scanning electron micrograph (SEM image) of the above-described silver powder (silver powder 1) observed at a magnification of 10,000 is shown in FIG. 1C. This SEM image was used for measuring the diameter (of a corresponding circle) of each of optional 100 particles or more, and the average value (SEM particle diameter) thereof was calculated. As a result, the SEM particle diameter was 1.32 µm.

Figure 2A:
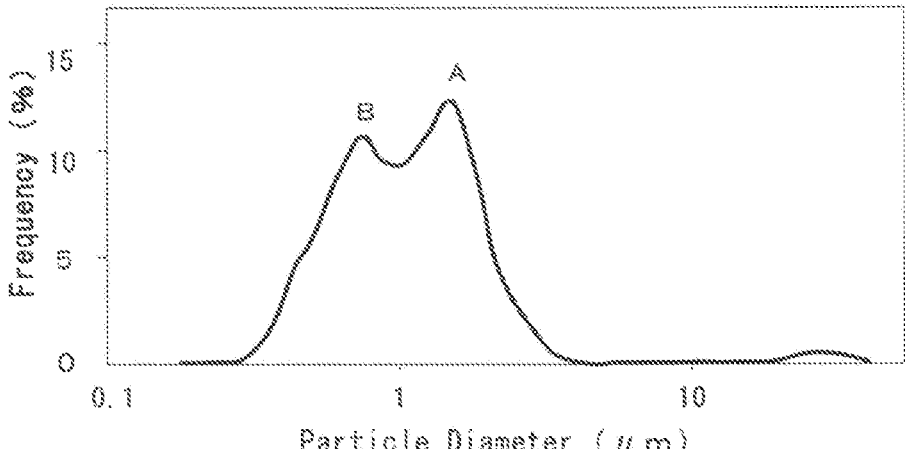
FIG. 2A is a graph showing a volume-based particle size distribution obtained by measuring a silver powder 2, which is used in examples, in a dry process by means of a laser diffraction particle size analyzer.

As the silver powder 2, another commercially available silver powder (AG-2-1C produced by DOWA Hightech Co., Ltd.) was prepared. The volume-based particle size distribution of the silver powder 2 (based on a dry laser diffraction particle size distribution measurement) was obtained by the same method as the above-described method. As a result, the particle diameter ($D_{10}$) corresponding to 10% of accumulation was 0.5 µm, the particle diameter ($D_{50}$) corresponding to 50% of accumulation was 0.9 µm, and the particle diameter ($D_{90}$) corresponding to 90% of accumulation was 1.9 µm. This particle size distribution had two peaks, at each of which a frequency was a local maximum value. Assuming that the particle diameter having the maximum frequency of the two peaks was a peak particle diameter A and that the particle diameter having a lower frequency than the maximum frequency was a peak particle diameter B, the peak particle diameter A was 1.5 µm at a frequency of 13.1%, and the peak particle diameter B was 0.7 µm at a frequency of 11.4%. The measured results are shown in FIG. 2A.

Figure 2B:
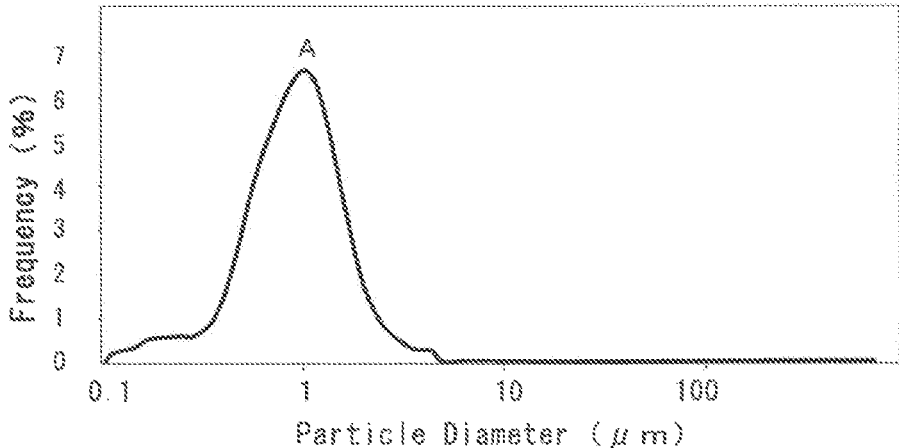
FIG. 2B is a graph showing a volume-based particle size distribution obtained by measuring the silver powder 2, which is used in examples, in a wet process by means of a laser diffraction scattering particle size analyzer.
Figure 2C:
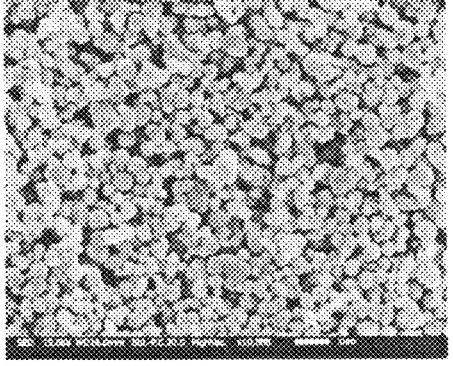
FIG. 2C is a SEM image of the silver powder 2 which is used in examples and which is observed at a magnification of 10,000.

With respect to the above-described silver power (silver powder 2), the volume-based particle size distribution of the silver powder (based on a wet laser diffraction scattering particle size distribution measurement) was obtained by the same method as the above-described method. As a result, the particle diameter ($D_{10}$) corresponding to 10% of accumulation was 0.4 μm, the particle diameter ($D_{50}$) corresponding to 50% of accumulation was 0.9 μm, and the particle diameter ($D_{90}$) corresponding to 90% of accumulation was 1.7 μm. This particle size distribution had one peak, at which a frequency was a local maximum value. Assuming that the particle diameter having the maximum frequency was a peak particle diameter A, it was 1.1 μm at a frequency of 6.6%. The measured results are shown in FIG. 2B. The SEM image of the above-described silver powder (silver powder 2) observed at a magnification of 10,000 is shown in FIG. 2C. This SEM image was used for measuring the diameter (of a corresponding circle) of each of optional 100 particles or more, and the average value (SEM particle diameter) thereof was calculated. As a result, the SEM particle diameter was 0.46 μm.

Then, 42.5 g (85% by weight) of the silver powder 1 and 7.5 g (15% by weight) of the silver powder 2 were put into an electrically operated coffee mill (ECG-62 produced by MELITTA JAPAN LIMITED) to be mixed for 4 minutes.

Figure 3A:
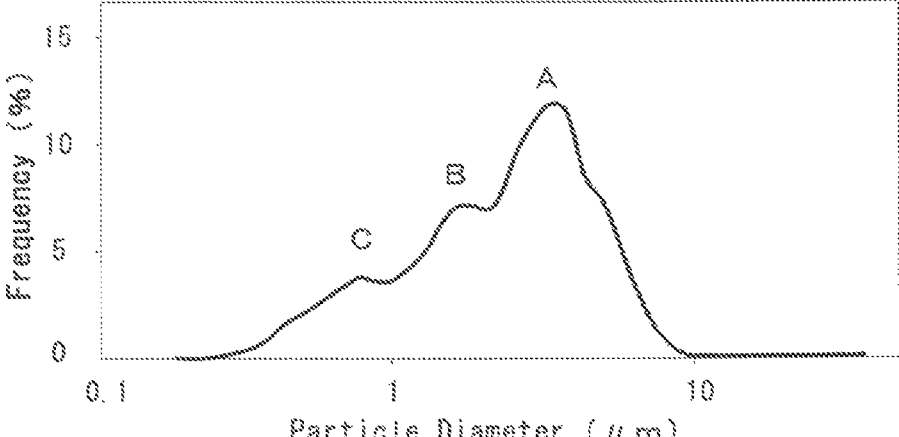
FIG. 3A is a graph showing a volume-based particle size distribution obtained by measuring a silver powder, which is obtained in Example 1, in a dry process by means of a laser diffraction particle size analyzer.

With respect to a silver powder (mixed silver powder) thus obtained, the volume-based particle size distribution of the silver powder (based on a dry laser diffraction particle size distribution measurement) was obtained by the same method as the above-described method. As a result, the particle diameter ($D_{10}$) corresponding to 10% of accumulation was 0.7 μm, the particle diameter ($D_{50}$) corresponding to 50% of accumulation was 2.3 μm, and the particle diameter ($D_{90}$) corresponding to 90% of accumulation was 4.5 μm. This particle size distribution had three peaks, at each of which a frequency was a local maximum value. Assuming that the particle diameter having the maximum frequency of the three peaks was a peak particle diameter A, that the particle diameter having a lower frequency than the maximum frequency was a peak particle diameter B and that the particle diameter having a lower frequency than that of the peak particle diameter B was a peak particle diameter C, the peak particle diameter A was 3.6 μm at a frequency of 11.6%, the peak particle diameter B was 1.8 μm at a frequency of 7.1%, and the peak particle diameter C was 0.7 μm at a frequency of 3.9%. The measured results are shown in FIG. 3A.

Figure 3B:
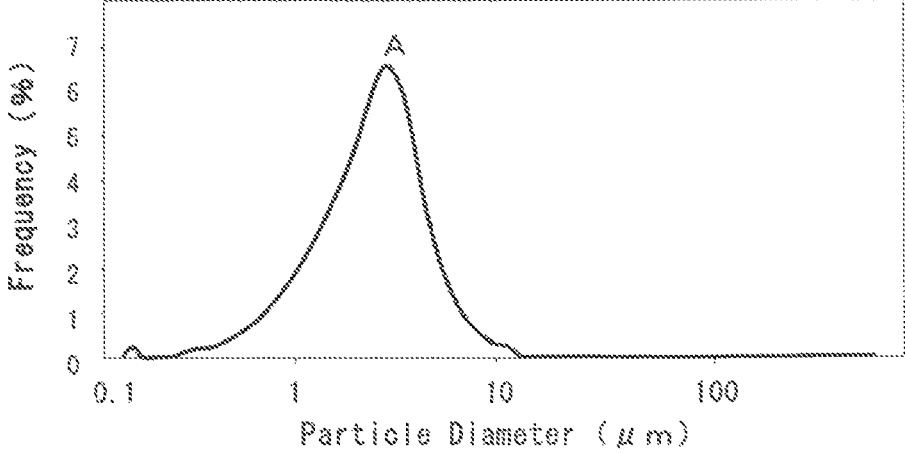
FIG. 3B is a graph showing a volume-based particle size distribution obtained by measuring the silver powder, which is obtained in Example 1, in a wet process by means of a laser diffraction scattering particle size analyzer.
Figure 3C:
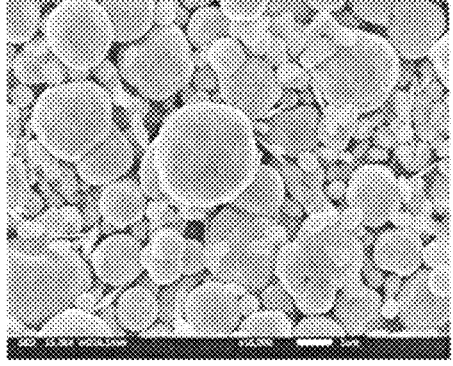
FIG. 3C is a SEM image of the silver powder which is obtained in Example 1 and which is observed at a magnification of 10,000.

With respect to the above-described silver power (mixed silver powder), the volume-based particle size distribution of the silver powder (based on a wet laser diffraction scattering particle size distribution measurement) was obtained by the same method as the above-described method. As a result, the particle diameter ($D_{10}$) corresponding to 10% of accumulation was 0.8 μm, the particle diameter ($D_{50}$) corresponding to 50% of accumulation was 2.1 μm, and the particle diameter ($D_{90}$) corresponding to 90% of accumulation was 4.1 μm. This particle size distribution had one peak, at which a frequency was a local maximum value. Assuming that the particle diameter having the maximum frequency was a peak particle diameter A, it was 2.5 μm at a frequency of 6.5%. The measured results are shown in FIG. 3B. The SEM image of the above-described silver powder (mixed silver powder) observed at a magnification of 10,000 is shown in FIG. 3C.

Then, 89.8% by weight of the obtained silver powder (mixed silver powder), 2.0% by weight of glass frits (FSGCO2 produced by Nippon Glass Co., Ltd.), 0.4% by weight of oleic acid serving as a dispersing agent, 0.2% by weight of a mixture of ethyl cellulose and hydroxypropyl cellulose serving as a resin, 6.2% by weight of a mixture of terpineol, Texanol and butyl carbitol acetate serving as a solvent, 1.1% by weight of water-added castor oil serving as a thixotropic agent, and 0.4% by weight of dimethylpolysiloxane serving as a line shape holding agent were kneaded by means of a propellerless planetary centrifugal vacuum degassing mixer (AR250 produced by Thinky Corporation) and then, by means of a three-roll mill (80S produced by EXAKT Inc.). Thereafter, the kneaded mixture thus obtained was caused to pass through a mesh of 500 μm to obtain an electrical conductive paste.

Then, after an aluminum paste (ALSOLAR 14-7021 produced by Toyo Aluminum K.K.) was printed on the backside of a silicon substrate (100 Ω/square) for solar cell in the shape of a rectangular pattern of 154 mm square by means of a screen printing machine (MT-320T produced by Micro-tech Co., Ltd.), it was dried at 200° C. for 10 minutes by means of a hot air type dryer. In addition, after the above-described electrically conductive paste was printed on the surface (upper side) of the silicon wafer in the shape of 110 finger electrodes, each having a width of 27 μm, and of four busbar electrodes, each having a width of 1.1 mm, by means of the screen printing machine (MT-320T produced by Micro-tech Co., Ltd.), it was dried at 200° C. for 10 minutes by means of the hot air type dryer. Then, it was fired at a peak temperature of 770° C. for an in-out time of seconds in the atmosphere by means of a fast firing IR furnace (Fast Firing Test Four-Chamber Furnace produced by NGK Insulators Ltd.), to form an electrical conductive film to produce a solar cell.

Then, the above-described solar cell was irradiated with pseudo sunlight having a light irradiation energy of 100 mW/cm² by means of a xenon lamp of a solar simulator (produced by Wacom Electric Co., Ltd.). As a result, when a short-circuit was established between the output terminals of the solar cell, the current (short circuit current) Isc flowing between the output terminals was 8.78 A. When the output terminals of the solar cell were open, the voltage (open circuit voltage) Voc between the output terminals was 0.63 V. The current density Jsc (the short circuit current Isc per 1 cm²) was $3.7 \times 10^{-2}$ A/cm². The value (fill factor) FF (=Pmax/Voc·Isc) obtained by dividing the maximum output Pmax (=Imax·Vmax) by a product of the open circuit voltage Voc and the current density Jsc was 79.66. The conversion efficiency (powder generation efficiency) Eff (the value obtained by multiplying 100 by a value obtained by dividing the maximum output Pmax by the amount of irradiation light (W) (per 1 cm²)) was a good value of 18.27%. The series resistance Rs was $6.4 \times 10^{-3}$ Ω/square.

Example 2

Figure 4A:
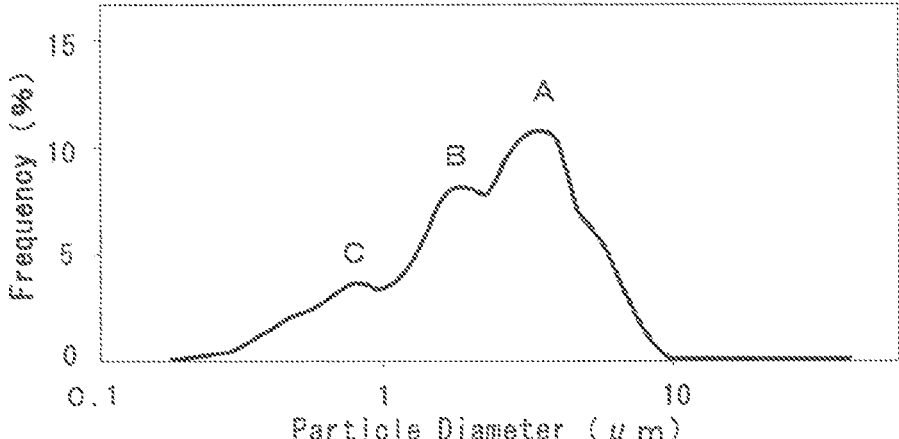
FIG. 4A is a graph showing a volume-based particle size distribution obtained by measuring a silver powder, which is obtained in Example 2, in a dry process by means of a laser diffraction particle size analyzer.

A silver powder (mixed silver powder) was obtained by the same method as that in Example 1, except that 5525 g (85% by weight) of the silver powder 1 and 975 g (15% by weight) of the silver powder 2 were put into a V-shape rotating mixer (DV-1-10 produced by DALTON Co., Ltd.) to be mixed at 60 rpm for 360 minutes. With respect to the silver powder (mixed silver powder) thus obtained, the volume-based particle size distribution of the silver powder (based on a dry laser diffraction particle size distribution measurement) was obtained by the same method as that in Example 1. As a result, the particle diameter ($D_{10}$) corresponding to 10% of accumulation was 0.6 μm, the particle diameter ($D_{50}$) corresponding to 50% of accumulation was 2.1 μm, and the particle diameter ($D_{90}$) corresponding to 90% of accumulation was 4.2 μm. This particle size distribution had three peaks, at each of which a frequency was a local maximum value. Assuming that the particle diameter having the maximum frequency of the three peaks was a peak particle diameter A, that the particle diameter having a lower frequency than the maximum frequency was a peak particle diameter B and that the particle diameter having a lower frequency than that of the peak particle diameter B was a peak particle diameter C, the peak particle diameter A was 3.0 μm at a frequency of 11.1%, the peak particle diameter B was 1.8 μm at a frequency of 8.4%, and the peak particle diameter C was 0.7 μm at a frequency of 3.8%. The measured results are shown in FIG. 4A.

Figure 4B:
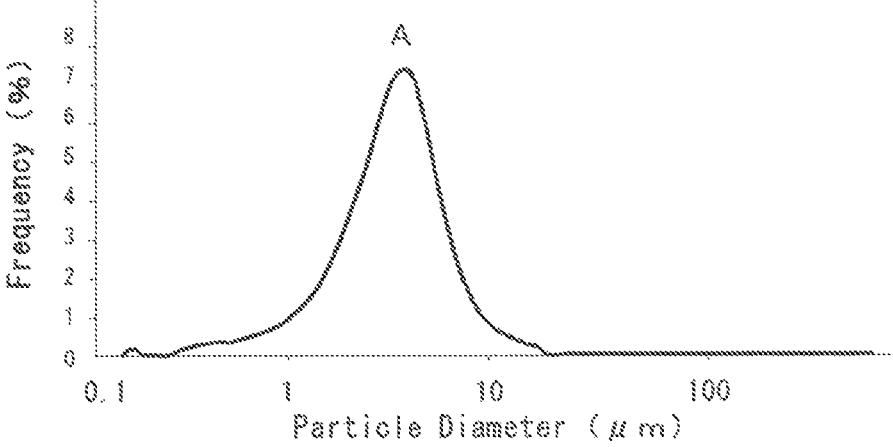
FIG. 4B is a graph showing a volume-based particle size distribution obtained by measuring the silver powder, which is obtained in Example 2, in a wet process by means of a laser diffraction scattering particle size analyzer.
Figure 4C:
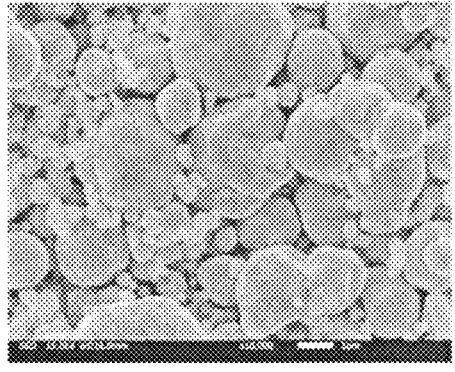
FIG. 4C is a SEM image of the silver powder which is obtained in Example 2 and which is observed at a magnification of 10,000.

With respect to the above-described silver power (mixed silver powder), the volume-based particle size distribution of the silver powder (based on a wet laser diffraction scattering particle size distribution measurement) was obtained by the same method as that in Example 1. As a result, the particle diameter ($D_{10}$) corresponding to 10% of accumulation was 0.9 μm, the particle diameter ($D_{50}$) corresponding to 50% of accumulation was 2.2 μm, and the particle diameter ($D_{90}$) corresponding to 90% of accumulation was 4.0 μm. This particle size distribution had one peak, at which a frequency was a local maximum value. Assuming that the particle diameter having the maximum frequency was a peak particle diameter A, it was 2.5 μm at a frequency of 7.1%. The measured results are shown in FIG. 4B. The SEM image of the above-described silver powder (mixed silver powder) observed at a magnification of 10,000 is shown in FIG. 4C.

After the obtained silver powder (mixed silver powder) was used for obtaining an electrical conductive paste to produce a solar cell by the same method as that in Example 1, the series resistance value thereof was obtained by the same method as that in Example 1. As a result, the series resistance was $6.4 \times 10^{-3}$ Ω/square.

Comparative Example 1

After 3670.1 g of an aqueous silver nitrate solution having a silver concentration of 1.4% by weight was put into a glass beaker, 161.6 g of an ammonia water having a concentration of 28% by weight (a molar equivalent of ammonia of 2.67 with respect to 1 mole of silver) was added to the aqueous silver nitrate solution. In 30 seconds after the ammonia water was added, 7.5 g of an aqueous sodium hydroxide solution having a concentration of 20% by weight was added thereto to obtain an aqueous silver ammine complex solution. This aqueous silver ammine complex solution was stirred for 3 minutes, and 357.6 g of an aqueous formaldehyde solution (obtained by diluting formalin with water) having a concentration of 21.0% by weight (a molar equivalent of 12.4 with respect to 1 mole of silver) was mixed with the stirred aqueous silver ammine complex solution. In 15 seconds after the mixing was started, 6.01 g of an ethanol solution containing 1.55% by weight of stearic acid (serving as a reducing agent) was added thereto, and then, the reducing reaction was completed to obtain a slurry containing silver particles. This slurry was filtered, and the solid thus obtained was washed with water until the electrical conductivity of the filtrate was 0.2 mS. Then, after the washed solid was dried at ° C. for 10 hours by means of a vacuum drier, the dried powder thus obtained was put into a pulverizing machine (SK-M10 produced by Kyoritsu Riko Co., Ltd.), and the pulverization for 30 seconds was repeated twice to obtain a silver powder.

Figure 5A:
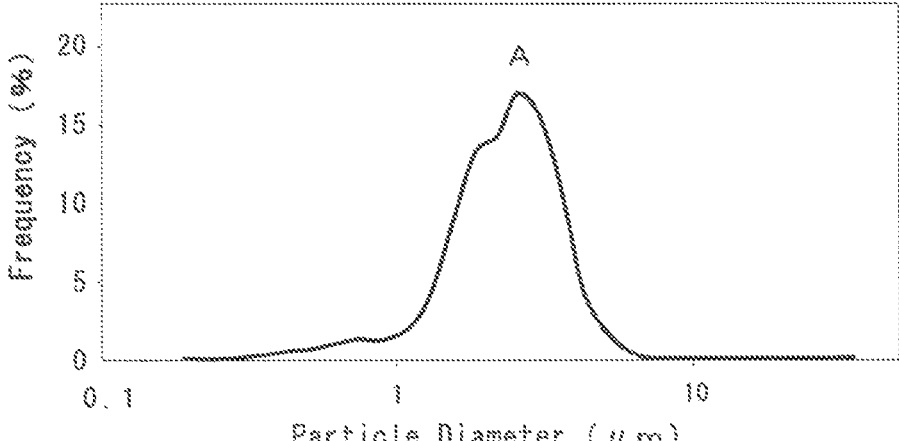
FIG. 5A is a graph showing a volume-based particle size distribution obtained by measuring a silver powder, which is obtained in Comparative Example 1, in a dry process by means of a laser diffraction particle size analyzer.

The silver powder thus obtained was used as the silver powder 1, and the volume-based particle size distribution of the silver powder (based on a dry laser diffraction particle size distribution measurement) was obtained by the same method as that in Example 1. As a result, the particle diameter ($D_{10}$) corresponding to 10% of accumulation was 1.0 μm, the particle diameter ($D_{50}$) corresponding to 50% of accumulation was 2.1 μm, and the particle diameter ($D_{90}$) corresponding to 90% of accumulation was 3.4 μm. This particle size distribution had one peak, at which a frequency was a local maximum value. Assuming that the particle diameter having the maximum frequency was a peak particle diameter A, it was 2.3 μm at a frequency of 17.4%. The measured results are shown in FIG. 5A.

Figure 5B:
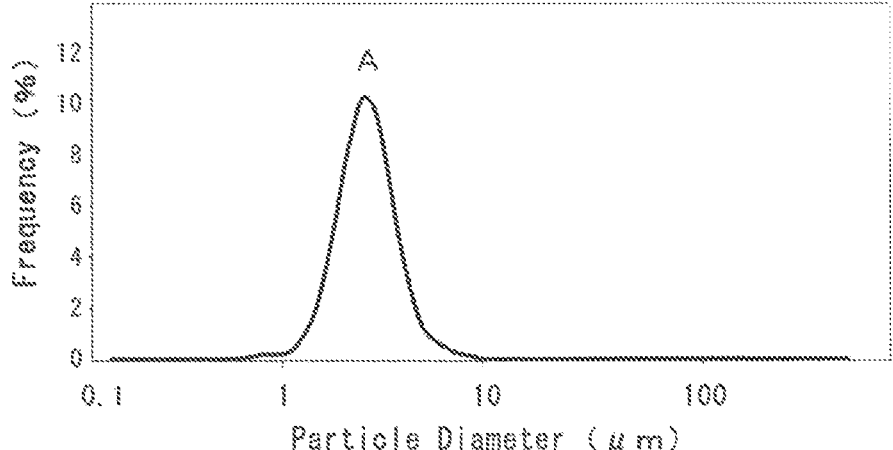
FIG. 5B is a graph showing a volume-based particle size distribution obtained by measuring the silver powder, which is obtained in Comparative Example 1, in a wet process by means of a laser diffraction scattering particle size analyzer.
Figure 5C:
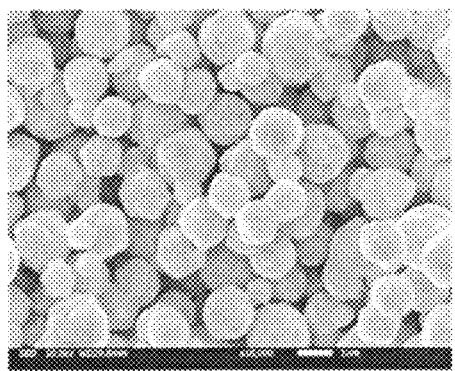
FIG. 5C is a SEM image of the silver powder which is obtained in Comparative Example and which is observed at a magnification of 10,000.

With respect to the obtained silver power (silver powder 1), the volume-based particle size distribution of the silver powder (based on a wet laser diffraction scattering particle size distribution measurement) was obtained by the same method as that in Example 1. As a result, the particle diameter ($D_{10}$) corresponding to 10% of accumulation was 1.1 μm, the particle diameter ($D_{50}$) corresponding to 50% of accumulation was 1.8 μm, and the particle diameter ($D_{90}$) corresponding to 90% of accumulation was 2.8 μm. This particle size distribution had one peak, at which a frequency was a local maximum value. Assuming that the particle diameter having the maximum frequency was a peak particle diameter A, it was 2.1 μm at a frequency of 10.2%. The measured results are shown in FIG. 5B. The SEM image of the above-described silver powder observed at a magnification of 10,000 is shown in FIG. 5C. This SEM image was used for measuring the diameter (of a corresponding circle) of each of optional 100 particles or more, and the average value (SEM particle diameter) thereof was calculated. As a result, the SEM particle diameter was 1.29 μm.

After the obtained silver powder (silver powder 1) was used (as it was without preparing mixed silver powder) for obtaining an electrical conductive paste to produce a solar cell by the same method as that in Example 1, the series resistance thereof was obtained by the same method as that in Example 1. As a result, the series resistance was $6.8 \times 10^{-3}$ Ω/square.

Comparative Example 2

After the silver powder 1 (AG-5-54F produced by DOWA Hightech Co., Ltd.) in Example was used (as it was without preparing mixed silver powder) for obtaining an electrical conductive paste to produce a solar cell by the same method as that in Example 1, the series resistance thereof was obtained by the same method as that in Example 1. As a result, the series resistance was $6.8 \times 10^{-3}$ Ω/square.

Comparative Example 3

As the silver powder 1, a commercially available silver powder (FA-S-16 produced by DOWA Hightech Co., Ltd.) was prepared. The volume-based particle size distribution of the silver powder (based on a dry laser diffraction particle size distribution measurement) was obtained by the same method as that in Example 1. As a result, the particle diameter ($D_{10}$) corresponding to 10% of accumulation was 0.5 µm, the particle diameter ($D_{50}$) corresponding to 50% of accumulation was 1.5 µm, and the particle diameter ($D_{90}$) corresponding to 90% of accumulation was 9.5 µm. This particle size distribution had three peaks, at each of which a frequency was a local maximum value. Assuming that the particle diameter having the maximum frequency of the three peaks was a peak particle diameter A, that the particle diameter having a lower frequency than the maximum frequency was a peak particle diameter B and that the particle size distribution measurement), the silver powder having two peaks, at each of which a frequency is a local maximum value in a volume-based particle size distribution (based on a wet laser diffraction scattering particle size distribution measurement), as this comparative example.

The characteristics of the silver powders in these examples and comparative examples are shown in Tables 1-2.

TABLE 1

Figure 6A:
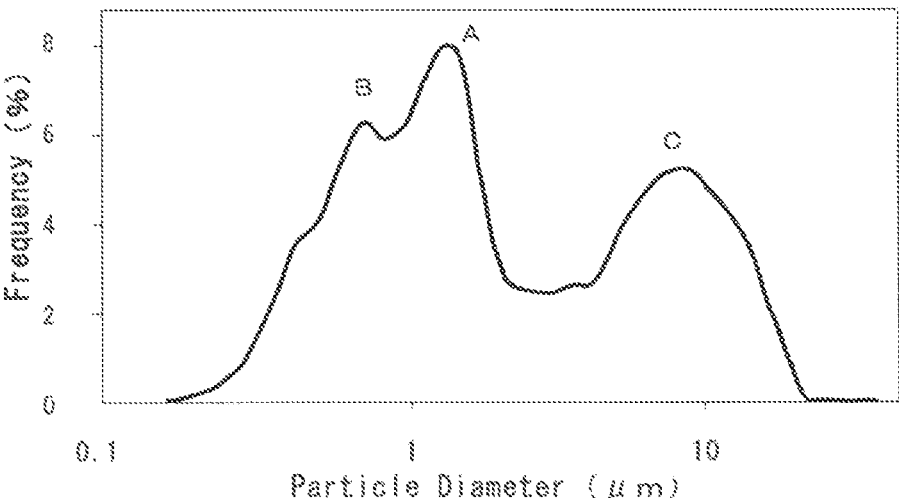
FIG. 6A is a graph showing a volume-based particle size distribution obtained by measuring a silver powder, which is obtained in Comparative Example 3, in a dry process by means of a laser diffraction particle size analyzer.

| | Silver Powder 1 | | | | | | Silver Powder 2 | | | | | |
|---|---|---|---|---|---|---|---|---|---|---|---|---|
| | (Dry) Particle Size Distribution (µm) | | | (Wet) Particle Size Distribution (µm) | | | (Dry) Particle Size Distribution (µm) | | | (Wet) Particle Size Distribution (µm) | | |
| | $D_{10}$ | $D_{50}$ | $D_{90}$ | $D_{10}$ | $D_{50}$ | $D_{90}$ | $D_{10}$ | $D_{50}$ | $D_{90}$ | $D_{10}$ | $D_{50}$ | $D_{90}$ |
| Ex. 1 | 1.4 | 2.8 | 4.2 | 1.7 | 2.5 | 3.9 | 0.5 | 0.9 | 1.9 | 0.4 | 0.9 | 1.7 |
| Ex. 2 | 1.4 | 2.8 | 4.2 | 1.7 | 2.5 | 3.9 | 0.5 | 0.9 | 1.9 | 0.4 | 0.9 | 1.7 |
| Comp. 1 | 1.0 | 2.1 | 3.4 | 1.1 | 1.8 | 2.8 | — | — | — | — | — | — |
| Comp. 2 | 1.4 | 2.8 | 4.2 | 1.7 | 2.5 | 3.9 | — | — | — | — | — | — |
| Comp. 3 | 0.5 | 1.5 | 9.5 | 0.5 | 1.9 | 9.8 | — | — | — | — | — | — | particle diameter having a lower frequency than that of the peak particle diameter B was a peak particle diameter C, the peak particle diameter A was 1.5 µm at a frequency of 8.0%, the peak particle diameter B was 0.7 µm at a frequency of 6.3%, and the peak particle diameter C was 8.6 µm at a frequency of 5.3%. The measured results are shown in FIG. 6A.

Figure 6B:
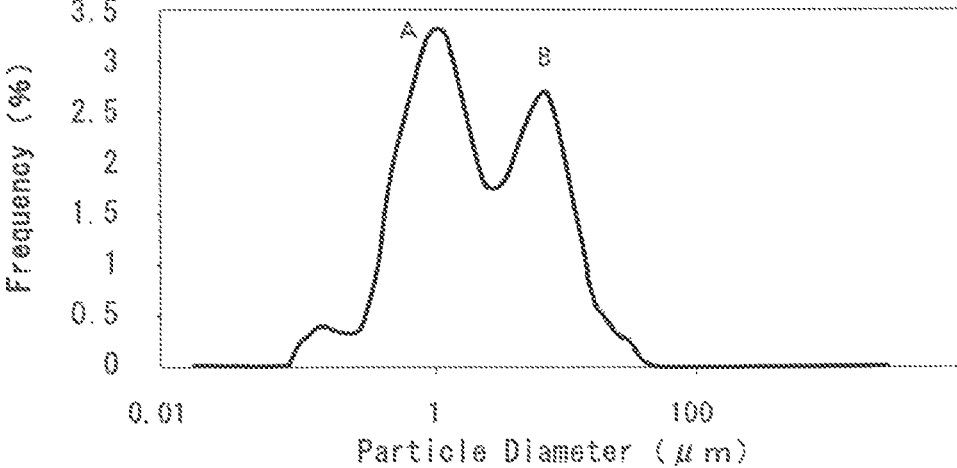
FIG. 6B is a graph showing a volume-based particle size distribution obtained by measuring the silver powder, which is obtained in Comparative Example 3, in a wet process by means of a laser diffraction scattering particle size analyzer.
Figure 6C:
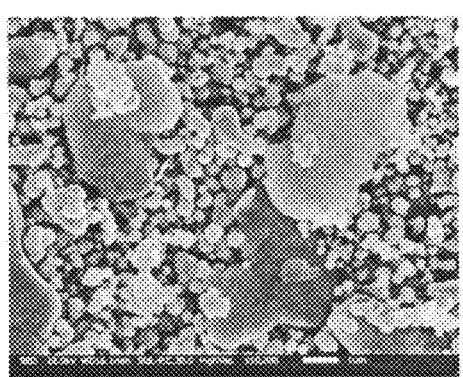
FIG. 6C is a SEM image of the silver powder which is obtained in Comparative Example and which is observed at a magnification of 10,000.
Figure 7:
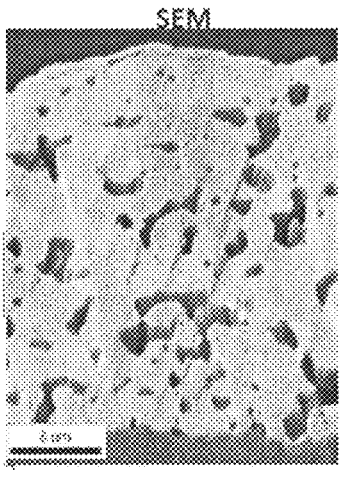
FIG. 7 is a scanning electron micrograph (SEM image) of a cross-section of an electrically conductive film after an electrically conductive paste obtained in Example 1 is fired.
Figure 8:
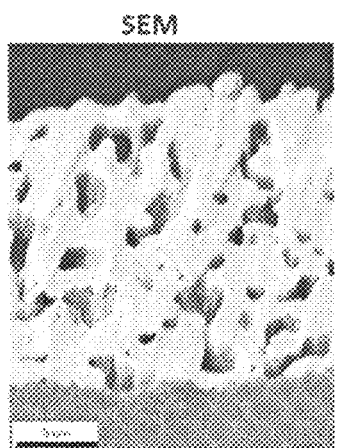
FIG. 8 is a SEM image of a cross-section of an electrically conductive film after an electrically conductive paste obtained in Example 2 is fired.
Figure 9:
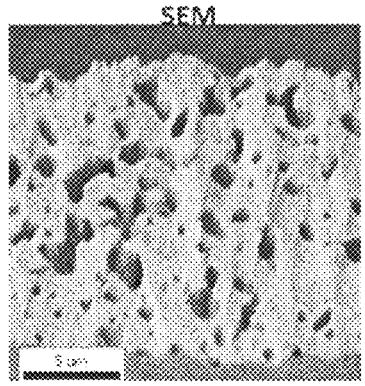
FIG. 9 is a SEM image of a cross-section of an electrically conductive film after an electrically conductive paste obtained in Comparative Example 1 is fired.
Figure 10:
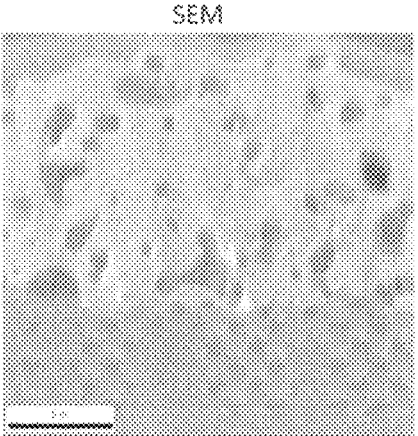
FIG. 10 is a SEM image of a cross-section of an electrically conductive film after an electrically conductive paste obtained in Comparative Example 2 is fired.

With respect to the above-described silver powder (silver powder 1), the volume-based particle size distribution of the silver powder (based on a wet laser diffraction scattering particle size distribution measurement) was obtained by the same method as that in Example 1. As a result, the particle diameter ($D_{10}$) corresponding to 10% of accumulation was 0.5 µm, the particle diameter ($D_{50}$) corresponding to 50% of accumulation was 1.9 µm, and the particle diameter ($D_{90}$) corresponding to 90% of accumulation was 9.8 µm. This particle size distribution had two peaks, at each of which a frequency was a local maximum value. Assuming that the particle diameter having the maximum frequency of the two peaks was a peak particle diameter A and that the particle diameter having a lower frequency than the maximum frequency was a peak particle diameter B, the peak particle diameter A was 1.4 µm at a frequency of 3.2%, and the peak particle diameter B was 7.1 µm at a frequency of 2.6%. The measured results are shown in FIG. 6B. The SEM image of the above-described silver powder observed at a magnification of 10,000 is shown in FIG. 6C.

After the above-described silver powder (silver powder 1) was used (as it was without preparing mixed silver powder) for obtaining an electrical conductive paste by the same method as that in Example 1, it was attempted to form an electrically conductive film to produce a solar cell by the same method as that in Example 1. However, the electrically conductive film was broken, so that it was not possible to measure the series resistance thereof. It is found that it is difficult to form a uniform high-filling film since the film has many cracks and scratches, if an electrically conductive paste using a silver powder is printed on a substrate, the silver powder having three peaks, at each of which a frequency is a local maximum value in a volume-based particle size distribution (based on a dry laser diffraction

TABLE 2

| | Silver Powder | | | | | | |
|---|---|---|---|---|---|---|---|
| | (Dry) Particle Size Distribution (µm) | | | (Wet) Particle Size Distribution (µm) | | | Series Resistance |
| | $D_{10}$ | $D_{50}$ | $D_{90}$ | $D_{10}$ | $D_{50}$ | $D_{90}$ | (Ω) |
| Ex. 1 | 0.7 | 2.3 | 4.5 | 0.8 | 2.1 | 4.1 | $6.4 \times 10^{-3}$ |
| Ex. 2 | 0.6 | 2.1 | 4.2 | 0.9 | 2.2 | 4.0 | $6.4 \times 10^{-3}$ |
| Comp. 1 | 1.0 | 2.1 | 3.4 | 1.1 | 1.8 | 2.8 | $6.8 \times 10^{-3}$ |
| Comp. 2 | 1.4 | 2.8 | 4.2 | 1.7 | 2.5 | 3.9 | $6.8 \times 10^{-3}$ |
| Comp. 3 | 0.5 | 1.5 | 9.5 | 0.5 | 1.9 | 9.8 | — |

Each of the solar cells obtained in Examples 1-2 and Comparative Examples 1-2 was broken in directions perpendicular to the surface thereof, and the milling of the cross-section thereof was carried out for 3 hours by intermittently repeating the turning ON and OFF (ON for 20 seconds and OFF for 10 seconds) at a beam current of 180 µA by means of an ion milling apparatus (ArBlade 500 produced by Hitachi High-Tech Science Corporation). The scanning electron micrograph (SEM image) of the milled cross-section of the electrically conductive film of each of the solar cells is shown in FIGS. 7-10.

Each of the SEM images shown in FIGS. 7-10 was analyzed by means of an image analyzing software (Mac-View produced by Mountech Co. Ltd.) to obtain the percentage of the area of cavities with respect to the area of the electrically conductive film. Furthermore, the used image analyzing software is designed that it is possible to calculate the area of the electrically conductive film and the area of the cavities if the outline of each of the electrically conductive film and cavities on the SEM image is traced by means of a touch pen. As a result, the percentage of the area of the cavities with respect to the area of the electrically conductive film was 14.4% in Example 1, 13.8% in Example 2, 18.7% in Comparative Example 1 and 22.8% in Comparative Example 2. Since the percentage of the area of the cavities with respect to the area of the electrically conductive film in Examples 1-2 is lower than that in Comparative Examples 1-2, it is considered from these results that the resistance value of each of the electrically conductive films in Examples 1-2 is lower than that in Comparative Examples 1-2.

It is possible to obtain an electrically conductive film having high conductivity if a silver powder according to the present invention is utilized as the material of a baked type electrically conductive paste in order to form electrodes of solar cells, internal electrodes of multilayer ceramic electronic parts, such as electronic parts using low-temperature co-fired ceramics (LTCC) and multilayer ceramic inductors, external electrodes of multilayer ceramic capacitors and/or multilayer ceramic inductors, and so forth.

The invention claimed is:

1. A method for producing a silver powder of silver, which is a mixed powder, the method comprising the steps of:

provide a first silver powder of silver having one peak or more, at each of which a frequency is a local maximum value in a volume-based particle size distribution obtained by measuring the first silver powder in a dry process by means of a laser diffraction particle size distribution analyzer;

providing a second silver powder of silver having two peaks or more, at each of which a frequency is a local maximum value in a volume-based particle size distribution obtained by measuring the second silver powder in a dry process by means of the laser diffraction particle size distribution analyzer; and mixing the first silver powder with the second silver powder to produce the mixed silver powder having three peaks or more, at each of which a frequency is a local maximum value in a volume-based particle size distribution obtained by measuring the mixed silver powder in a dry process by means of the laser diffraction particle size distribution analyzer, the mixed silver powder having one peak, at which a frequency is a local maximum value in a volume-based particle size distribution obtained by measuring the mixed silver powder in a wet process by means of a laser diffraction scattering particle size distribution analyzer, wherein a particle diameter ($D_{50}$) corresponding to 50% of accumulation in a volume-based particle size distribution obtained by measuring the first silver powder in the wet process is in the range of from 1 μm to 4 μm, wherein a particle diameter ($D_{50}$) corresponding to 50% of accumulation in a volume-based particle size distribution obtained by measuring the second silver powder in the wet process is in the range of from 0.3 μm to 1 μm, and wherein a weight ratio (first silver powder:second silver powder) of the first silver powder to the second silver powder in the mixed silver powder is 95:5 to 50:50.

2. A method for producing a silver powder as set forth in claim 1, wherein the particle diameter ($D_{50}$) corresponding to 50% of accumulation in a volume-based particle size distribution obtained by measuring the first silver powder in the wet process is larger than the particle diameter ($D_{50}$) corresponding to 50% of accumulation in a volume-based particle size distribution obtained by measuring the second silver powder in the wet process.

3. A method for producing a silver powder as set forth in claim 1, wherein the particle diameter ($D_{50}$) corresponding to 50% of accumulation in a volume-based particle size distribution obtained by measuring the first silver powder in the wet process is not greater than 4 times as large as the particle diameter ($D_{50}$) corresponding to 50% of accumulation in a volume-based particle size distribution obtained by measuring the second silver powder in the wet process.

4. A method for producing a silver powder as set forth in claim 1, wherein the measurement in the wet process by means of the laser diffraction scattering particle size distribution analyzer is carried out in a state that the mixed silver powder is dispersed in isopropyl alcohol.

5. A silver powder of silver, the silver powder having three peaks or more, at each of which a frequency is a local maximum value in a volume-based particle size distribution obtained by measuring the silver powder in a dry process by means of a laser diffraction particle size distribution analyzer, the silver powder having one peak, at which a frequency is a local maximum value in a volume-based particle size distribution obtained by measuring the silver powder in a wet process by means of a laser diffraction scattering particle size distribution analyzer, wherein a particle diameter ($D_{50}$) corresponding to 50% of accumulation in a volume-based particle size distribution obtained by measuring the silver powder in the wet process is in the range of from 1.2 μm to 3.0 μm, and wherein the silver powder of silver is a mixed silver power comprising:

a first silver powder of silver having one peak or more, at each of which a frequency is a local maximum value in a volume-based particle size distribution obtained by measuring the first silver powder in a dry process by means of a laser diffraction particle size distribution analyzer; and a second silver powder of silver having two peaks or more, at each of which a frequency is a local maximum value in a volume-based particle size distribution obtained by measuring the second silver powder in a dry process by means of the laser diffraction particle size distribution analyzer, wherein a particle diameter ($D_{50}$) corresponding to 50% of accumulation in a volume-based particle size distribution obtained by measuring the first silver powder in the wet process is in the range of from 1 μm to 4 μm, wherein a particle diameter ($D_{50}$) corresponding to 50% of accumulation in a volume-based particle size distribution obtained by measuring the second silver powder in the wet process is in the range of from 0.3 μm to 1 μm, and wherein a weight ratio (first silver powder:second silver powder) of the first silver powder to the second silver powder in the mixed silver powder is 95:5 to 50:50.

6. A silver powder as set forth in claim 5, wherein a ratio of a particle diameter ($D_{90}$), which corresponds to 90% of accumulation in the volume-based particle size distribution of the silver powder, to a particle diameter ($D_{10}$), which corresponds to 10% of accumulation in the volume-based particle size distribution thereof, is in the range of from 2.0 to 8.0.

7. A silver powder as set forth in claim 5, wherein the measurement in the wet process by means of the laser diffraction scattering particle size distribution analyzer is carried out in a state that the silver powder is dispersed in isopropyl alcohol.

8. An electrically conductive paste comprising a silver powder as set forth in claim 5 dispersed in an organic component.

9. A method for producing a silver powder as set forth in claim 1, wherein the silver powder has three peaks or more, at each of which a frequency is a local maximum value in a volume-based particle size distribution obtained by measuring the silver powder in a dry process by means of a laser diffraction particle size distribution analyzer, the silver powder having one peak, at which a frequency is a local maximum value in a volume-based particle size distribution obtained by measuring the silver powder in a wet process by means of a laser diffraction scattering particle size distribution analyzer.

* * * * *